United States Patent [19]
Gantzer

[11] Patent Number: 5,605,032
[45] Date of Patent: Feb. 25, 1997

[54] DEVICE FOR CUTTING AND CHOPPING AND/OR CRUSHING CUT PLANTS

[75] Inventor: Jean-Paul Gantzer, Dannelbourge, France

[73] Assignee: Kuhn S.A., Saverne Cedex, France

[21] Appl. No.: 379,998

[22] Filed: Jan. 27, 1995

[30] Foreign Application Priority Data

Jan. 27, 1994 [FR] France .................... 9401052

[51] Int. Cl.⁶ .................................. A01D 34/73
[52] U.S. Cl. ........................ 56/6; 56/16.4 B; 56/295; 56/DIG. 20
[58] Field of Search .................... 56/6, 15.2, 16.4, 56/16.9, 255, 295, DIG. 17, DIG. 20

[56] References Cited

U.S. PATENT DOCUMENTS

| | | | |
|---|---|---|---|
| 4,711,074 | 12/1987 | Jetzinger | 56/295 X |
| 5,345,752 | 9/1994 | Pruitt et al. | 56/6 |
| 5,404,695 | 4/1995 | Gemelli | 56/6 |

FOREIGN PATENT DOCUMENTS

| | | |
|---|---|---|
| 459667 | 4/1975 | Australia . |
| 2111471 | 6/1972 | France . |
| 2685993 | 7/1993 | France . |
| 2686031 | 7/1993 | France . |
| 1902599 | 8/1969 | Germany . |
| 4507154 | 11/1973 | Germany . |
| 2608145 | 9/1977 | Germany . |
| 4009888 | 10/1990 | Germany . |
| 9107825 | 8/1991 | Germany . |

OTHER PUBLICATIONS

Agritechnica 93—Mortl FT-HT DerMaher–Spezialist, Mr. 4461/1 11/93.

*Primary Examiner*—Terry Lee Melius
*Attorney, Agent, or Firm*—Oblon, Spivak, McClelland, Maier & Neustadt, P.C.

[57] ABSTRACT

The present invention relates to a device which is to be combined with a bar with disks, that include a plurality of cutting elements with each one turning about its respective axis. The axes of the cutting elements are directed upward during work and are arranged alongside each other along a transversal line with respect to a forward direction of the device during work. Each cutting element is made of a cutting disk including cutting blades connected to the cutting disks and a support which is also provided with blades. Each support is connected to the corresponding cutting disks. The cutting bard and disk of the present invention permit the cutting and chopping and/or crushing of plants or vegetables.

19 Claims, 8 Drawing Sheets

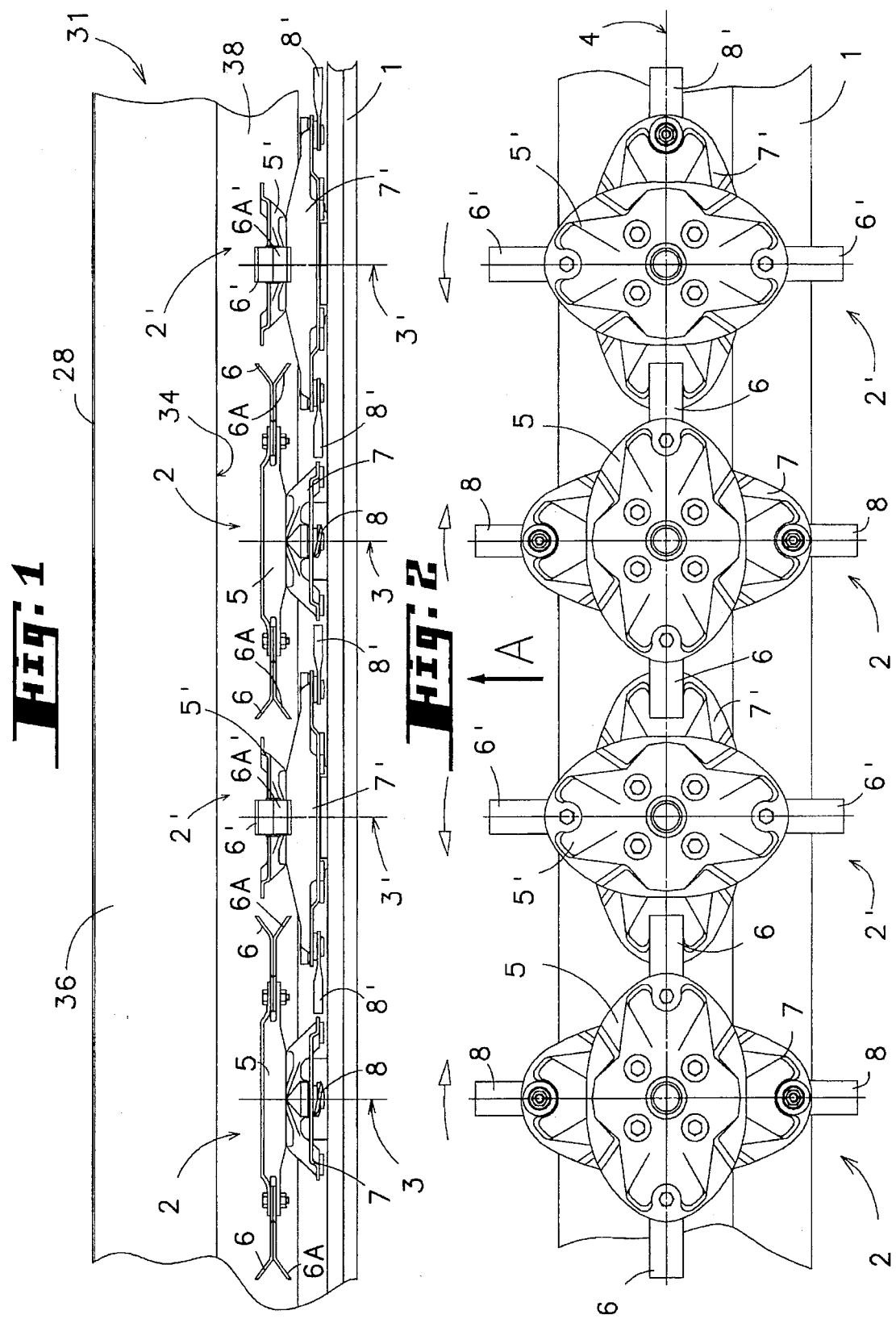

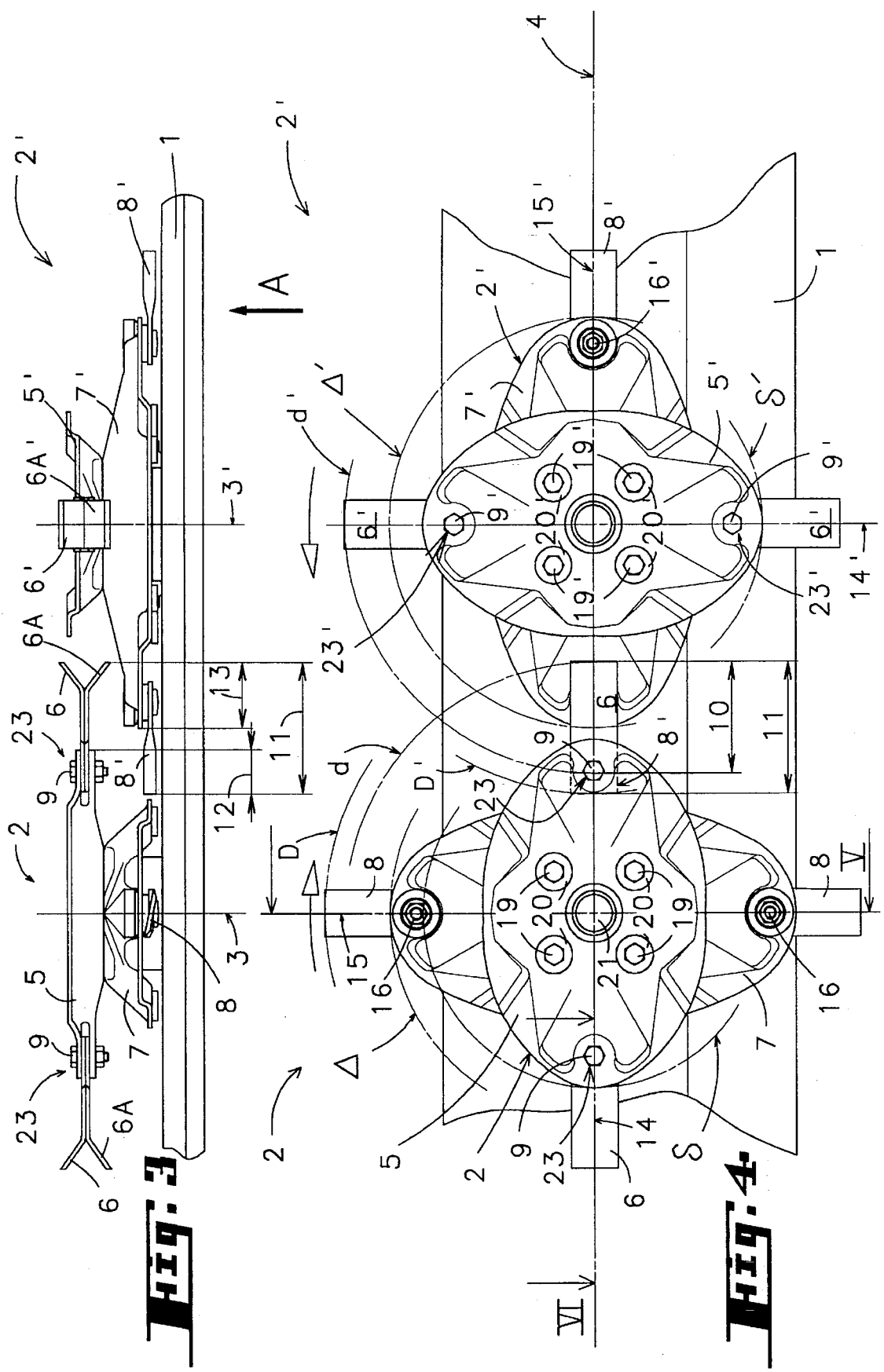

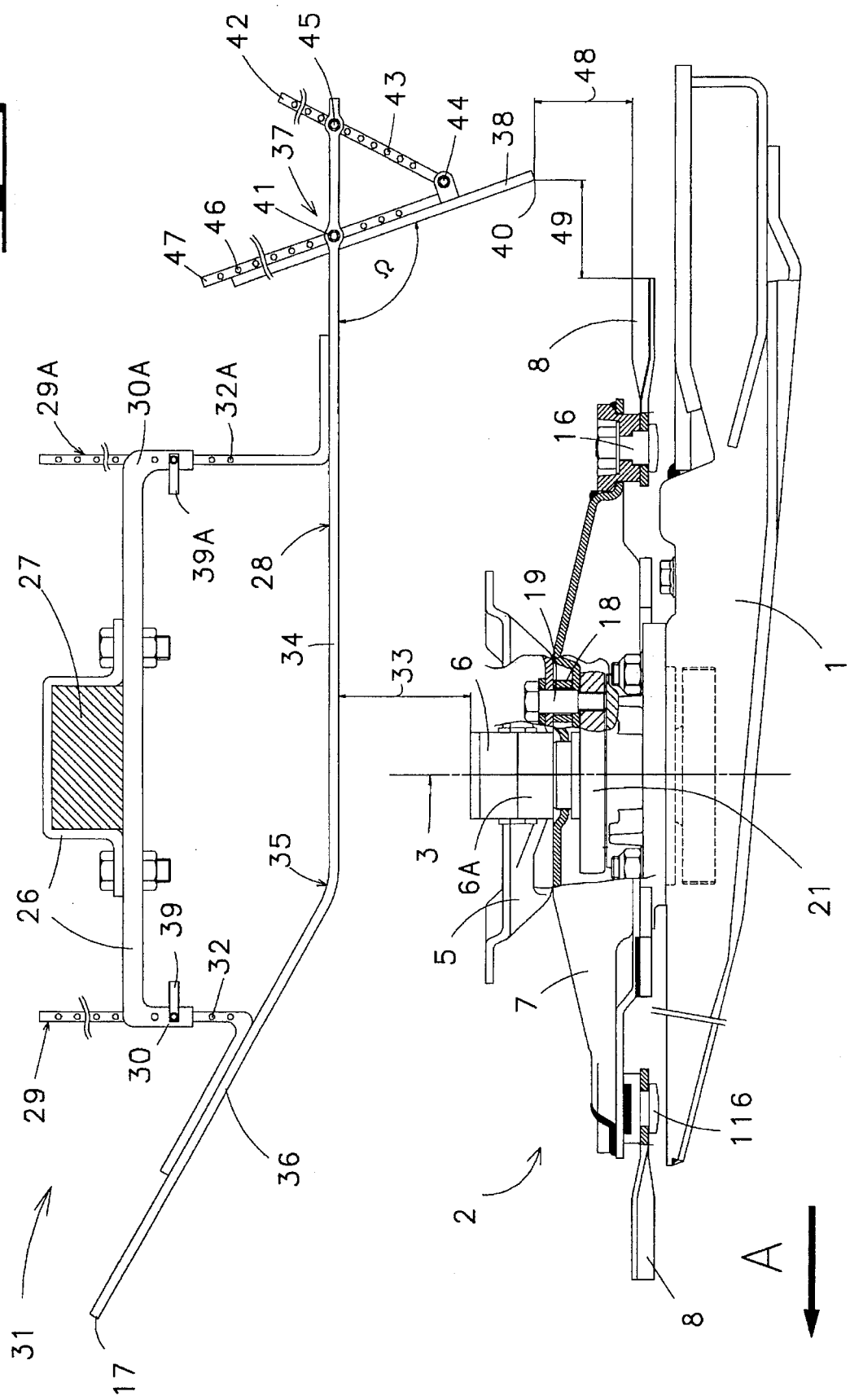

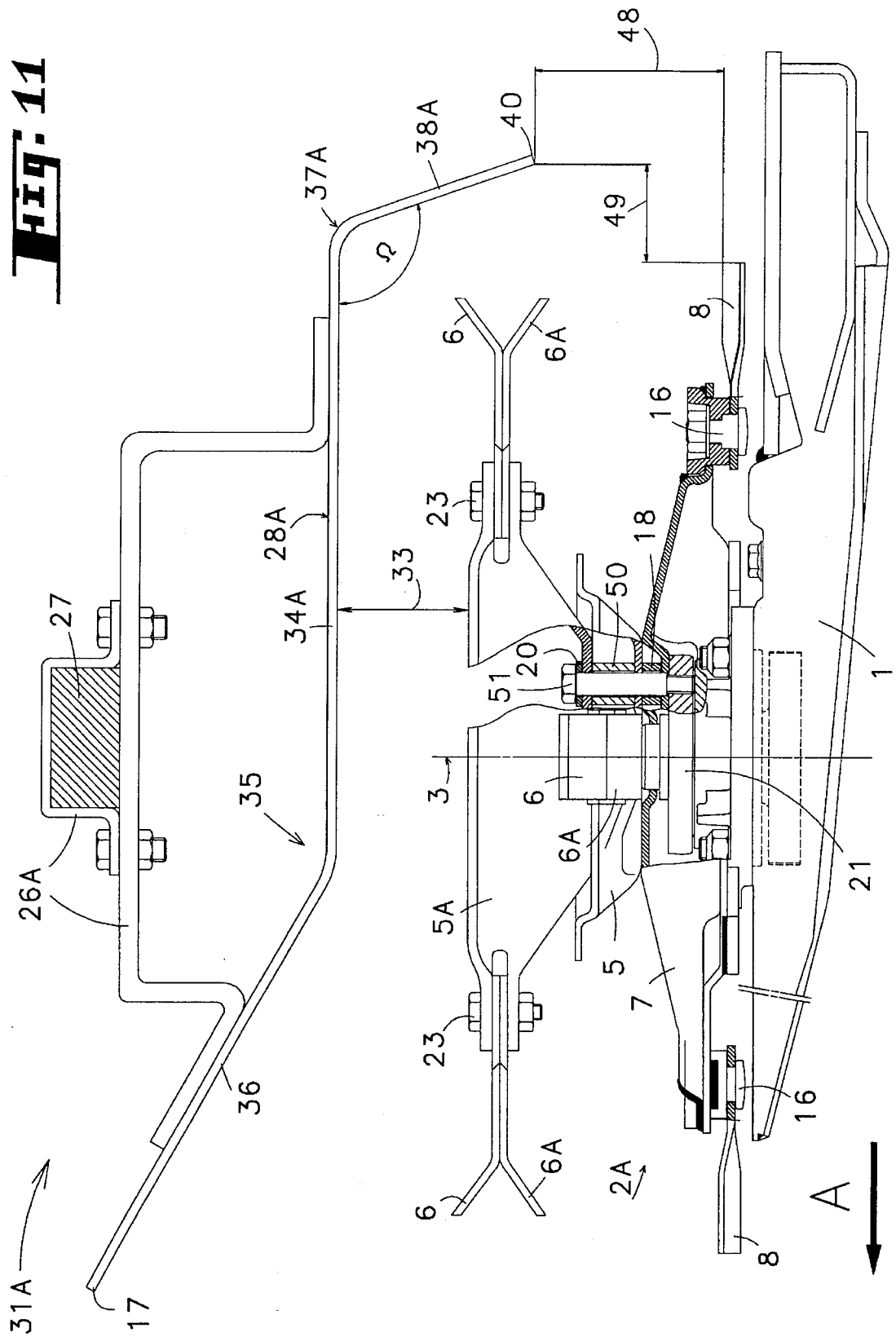

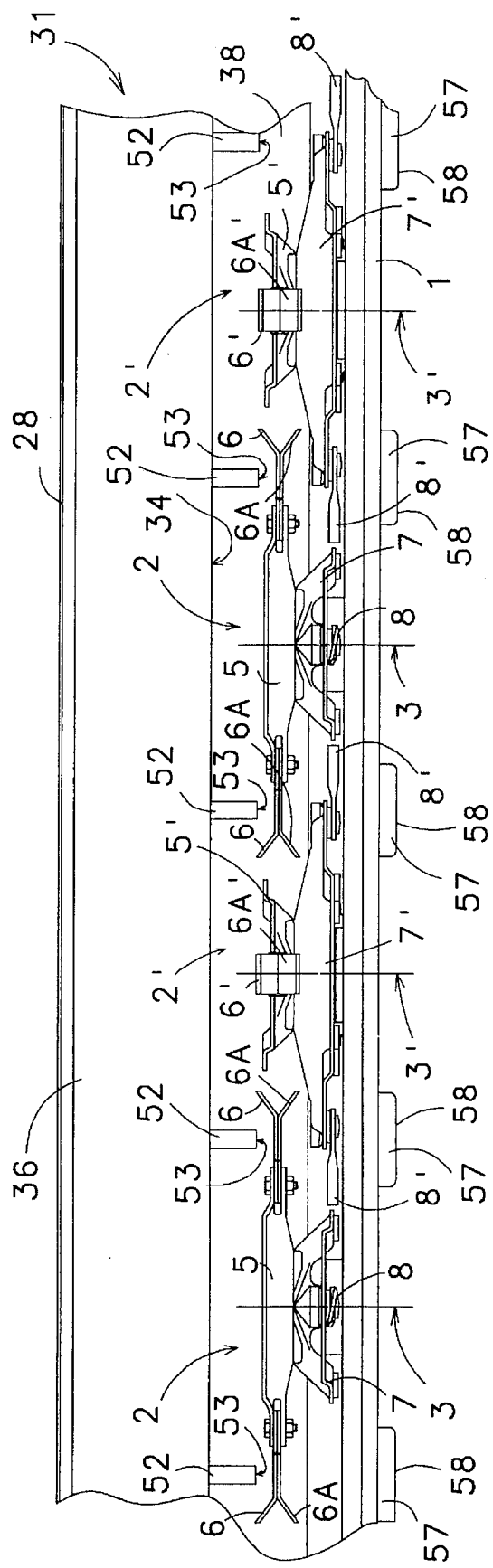

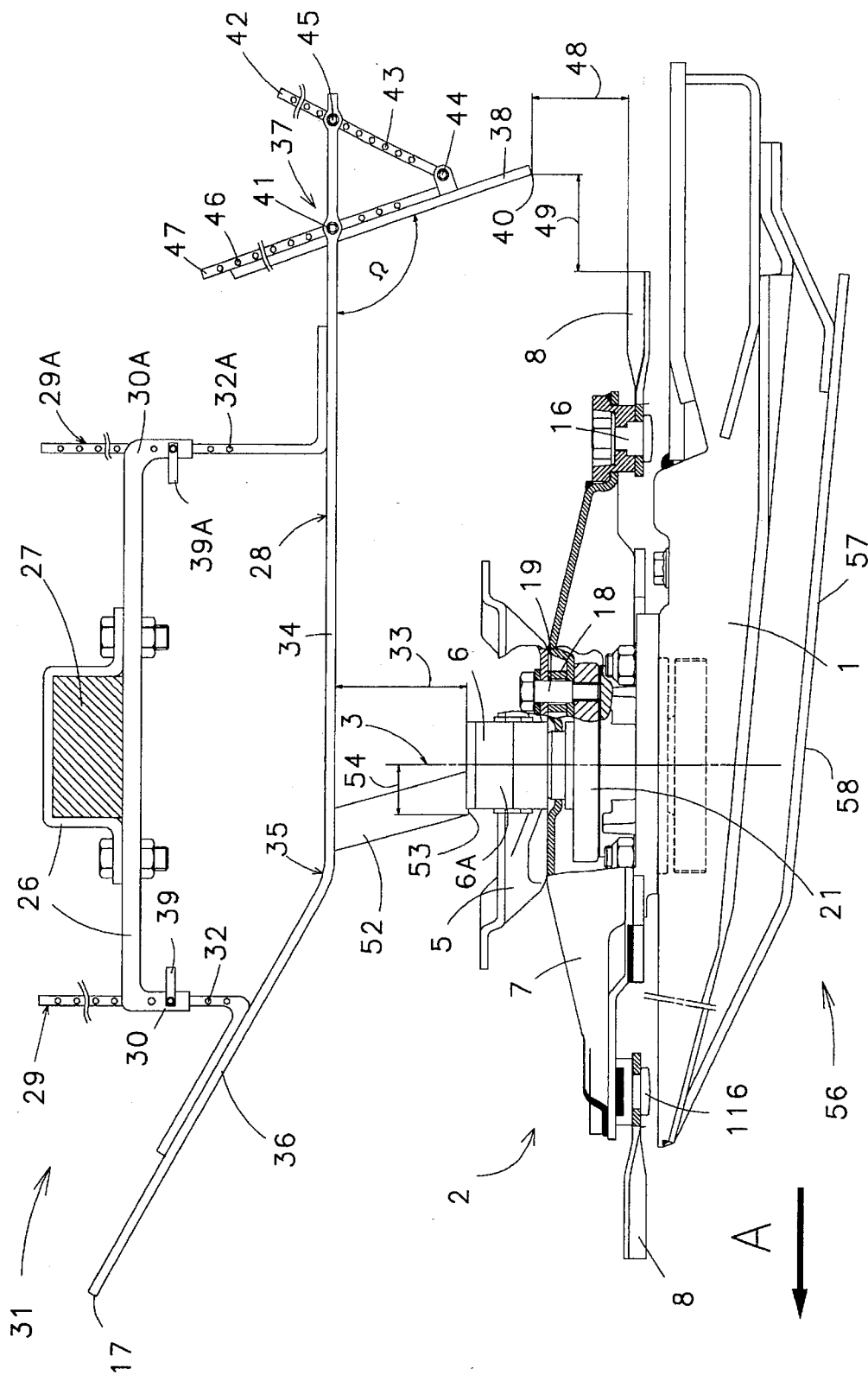

5,605,032

1

DEVICE FOR CUTTING AND CHOPPING AND/OR CRUSHING CUT PLANTS

BACKGROUND OF THE INVENTION

1. Field of the Invention

This invention pertains to a device which is to be combined with a bar with disks, which includes a large number of cutting elements with each one turning about its respective bars, directed upward during the working process (preferably approximately vertical) and arranged each one beside the other along a transversal line with respect to the forward direction during the working process, each cutting dement being made of a cutting disk and cutting blades connected to the cutting disk.

The combination of a cutting bar with disks and the device in question allows one to accomplish cutting and chopping and/or crushing of vegetables.

2. Discussion of the Background

A conventional device includes a rotor which is provided with blades extending above the cutting elements of the bar with disks, and the stationary counter-blades installed to the rear of the disk bar and used to work together with the blades of the rotor to chop and/or crush the vegetables which are cut by the cutting elements of the bar with disks.

The rotor turns at high speed around a shaft extending parallel to the transversal line along which are arranged the cutting elements of the bar with disks. It includes rows of attached blades arranged parallel to its axis of rotation and turns in a direction so that in front the blades are displaced toward the cutting elements of the bar with disks.

The stationary blades extend behind the cutting elements along a row which is parallel to the line along which the cutting elements extend.

The plants which are cut by the cutting elements of the bar with disks are picked up again by the attached blades of the rotor. The latter carry the plants toward the bar and toward the rear, and make them pass over the counter blades. It is at this level that the plants must be chopped and/or crushed especially because of the high rotational speed of the rotor. The chopped and/or crushed plants are then spread over a large area.

This machine is particularly intended for use on unplowed and fallow fields.

By using the bar with disks one can make a very clean cut, which cannot be attained with the choppers and grinders.

The conventional device can, however, present certain disadvantages. A first disadvantage lies in the fact that the rotor leaves the cut plants on the cutting disks of the disk bar. From this action there should be a not-negligible absorption of power. In other respects it is possible that under certain conditions obstructions could appear. Another disadvantage lies in the introduction of stationary counter blades. Because of their position near the ground the fear exists that they can be easily damaged. It is not out of the question that they might be damaged when stones, for example, pass through the machine.

SUMMARY OF THE INVENTION

This invention has as an object another solution of a device intended to be combined with a disk cutting bar for the purpose of cutting and chopping and/or crushing cut plants.

For this purpose the device in accordance with the invention which is to be combined with a disk bar which includes a large number of cutting elements, each one rotating about its respective axis, directed upward during work process (preferably approximately vertically), the large number of cutting elements being arranged alongside one another along a transversal line with respect to the forward direction during the work process, each cutting element comprising a cutting disk and cutting blades connected to the cutting disk, characterized by the fact that it includes:

a) a large number of cutting groups, each one including at least one support provided with at least one blade, and intended to be attached to the cutting disk of a corresponding cutting element, one cutting group and the corresponding cutting element constituting one chopping and/or crushing component; and b) a hood intended to hang over the chopping and/or crushing components.

According to an additional characteristic of the invention, the at least one blade of one support will sweep, in installed position and seen from above, a circular area smaller than the circular area swept by the cutting blades of the corresponding cutting disk.

According to an additional characteristic of the invention, the at least one blade of one support will sweep, in rising position and seen from above, a circular surface area which overlaps for a certain distance the circular surface swept by the at least one blade of an adjacent support.

According to an additional characteristic of the invention, the at least one blade of the support will sweep, in rising position and seen from above, a circular area which overlaps for a certain distance the circular area swept by the cutting blades of an adjacent cutting disk.

According to another additional characteristic of the invention, at least one support sweeps, in rising position and seen from above, a circular area which overlaps for a certain distance the circular area swept by the cutting blades of an adjacent cutting disk.

According to another additional characteristic of the invention, the at least one blade of at least one support will sweep, in rising position and seen from above, a circular area which overlaps for a certain distance the circular area swept by an adjacent cutting disk.

According to another additional characteristic of the invention, the at least one support is provided with several blades which are regularly arranged along the edge of the at least one support.

According to another additional characteristic of the invention, the at least one support is provided with several blades which are, in rising position and seen from above, offset at an angle with respect to the cutting blades of the corresponding cutting disk.

When each support, each cutting disk respectively, includes two blades, two cutting blades respectively, each support is preferably secured above the corresponding cutting disk in a manner so that a straight line passing through a connection point of these two blades forms an angle which is at least approximately a right angle with the corresponding straight line passing through a connection point of the two cutting blades of the corresponding cutting disk.

According to another additional characteristic of the invention, when each cutting group includes two supports, the blades of one support of the cutting group are, as seen from above, offset at an angle with respect to the blades of the other support of the cutting group.

When each support includes two blades, the supports are arranged, in rising position and seen from above, so that a straight line passing by a connection point of said two blades to said support will form an at least approximately right angle with a straight line passing through a connection point of said two blades of the other support.

Preferably these are the blades of the upper support which are located above the cutting blades of the corresponding cutting disk.

According to another additional characteristic of the invention, at least one support is provided with several blades which are, in rising position and seen from above, offset at an angle with respect to the blades of an adjacent support.

According to another additional characteristic of the invention, the supports are similar to the cutting disks.

Advantageously, each support is centered with respect to its respective cutting disk.

According to another additional characteristic of the invention, the blades are installed in shells provided on the corresponding supports by intermediate hinged joints.

Advantageously, each hinge joint includes:
- a cross-piece which extends on the one hand between the two flanges of the shell and, on the other hand, across holes provided in the blades, its length being slightly larger than the width of the two blades, and
- a lug which extends across the holes provided in the two flanges of the shell and the cross-piece.

Also advantageously, each hinge joint connects one or several blades to the corresponding support. Preferably, two bent blades placed against one another so as to form a "Y" are joined to each hinge.

According to an additional characteristic of the invention, the hood includes a deflecting plate which includes a first area which is approximate horizontal and flat, located above the chopping and/or crushing components, and at the edge in front of which is attached a second area which extends toward the front and upward, while at the rear edge of the first area there is attached a third area extending toward the bottom.

Advantageously, in rising position, the front edge of the first area is located somewhat forward of the axis of rotation of the chopping and/or crushing components.

According to an additional characteristic of the invention, there is provided at least one holding element used to slow down the discharge of plants to the rear of the machine in order to ensure proper chopping and/or crushing of the latter.

For this purpose, each holding element, seen orthogonally in the forward direction during work, can be advantageously secured to the first area of the deflecting plate between the forward edge of the latter and the axes of rotation of the corresponding chopping and/or crushing components and, along the forward movement direction during work, at least approximately in the central part between the axes of rotation of the corresponding chopping and/or crushing components, each holding component extending also, from its attachment point, to the first area toward the rear and downward, in order to avoid accumulation of plants around the holding components.

In a preferred implementation of the invention, the holding component can be made of a flat piece of iron.

Moreover, the front edge of the second area extends approximately above the front section of the circular area which is swept clear by the cutting blades.

The rear edge of the first area is located approximately above the rear section of the circular area swept clear by the cutting blades.

In the invention one can provide that the vertical distance between the first area and the chopping and/or crushing components is adjustable.

One can also provide that the angle which forms the third area with the first area is adjustable.

One can also ensure that the vertical distance between the lower edge of the third area and the area swept clear by the cutting blades of the cutting disks is adjustable.

Moreover, one might also provide that the longitudinal distance (following the traveled direction during the work) between the lower edge of the third area and the rear section of the circular area swept clear by the cutting blades of the cutting disks is adjustable.

The lower edge of the third area advantageously will be located higher than the cutting blades and, considering the travel direction during work, to the rear of the rear section of the circular area swept clear by the cutting blades.

According to an additional characteristic, the invention will include in addition an elevating device to be installed under the disk bar. This will allow one to avoid accumulation of plants in front of the cutting bar, and the latter will function as a collector.

The invention also pertains to a cutting machine provided with a disk bar, which includes a large number of cutting elements, each one turning about a respective axis directed upward during work (preferably approximately vertical) and arranged alongside one another along a transversal line with respect to the travel direction during work each cutting element comprising a cutting disk and cutting blades, and the cutting machine is provided with a device in accordance with the invention.

Preferably, the chopping and/or crushing components of the cutting machine in accordance with the invention are driven synchronously.

BRIEF DESCRIPTION OF THE DRAWINGS

Other purposes and characteristics of the invention will be apparent from the following description, with reference to the attached drawings which present, by way of non-limiting examples, some forms of implementation of the device in accordance with the invention.

On these drawings:

FIG. 1 is a front view of a first form of implementation of the device installed on a disk bar;

FIG. 2 is a view from above of the mechanism shown in FIG. 1, without the hood;

FIG. 3 is a blown up view of the mechanism shown in FIG. 1, without the hood;

FIG. 4 is a view from above of the mechanism shown in FIG. 3;

FIG. 5 is a side view along the V plane defined in FIG. 4, on which different partial sections have been presented;

FIG. 11 is a side view, along the XI plane defined in FIG. 10, on which different partial sections have been shown;

FIG. 12 is a front view of a third form of implementation of the device installed on a disk bar; and FIG. 13 is a side view, along the XIII plane defined in FIG. 12.

DESCRIPTION OF THE PREFERRED EMBODIMENTS

Figure 6:
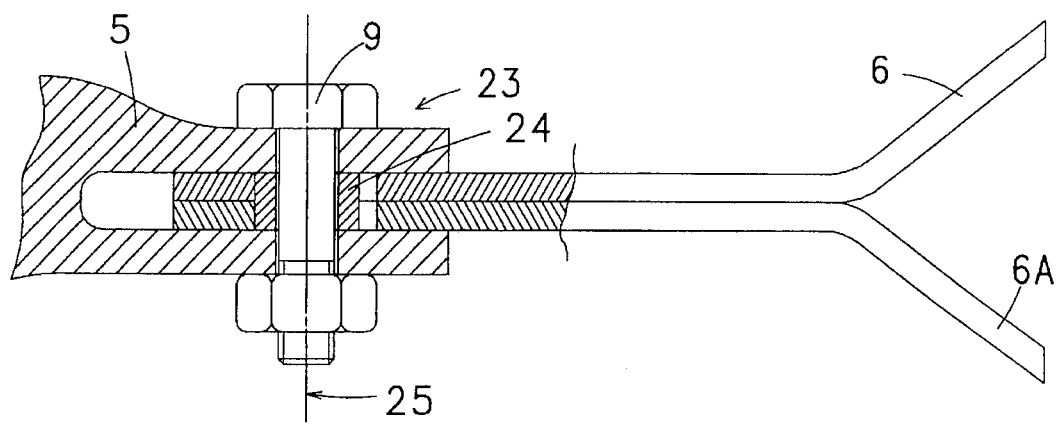
FIG. 6 is a partial sectional view along the VI plane defined in FIG. 4 of the installation of blades on the support of one cutting group of the device.

Referring now to the drawings, wherein like reference numerals designate identical or corresponding parts throughout the several views, a disk bar (1) combined with the device in accordance with the invention includes chopping and/or crushing components (2, 2', 2A, 2A') each one turning, during work, about its respective axis (3, 3') approximately vertical and arranged alongside one another along a transversal line (4) with respect to the travel direction (A) during work. These chopping and/or crushing components (2, 2', 2A, 2A') are made to rotate synchronously.

On FIGS. 1 to 5, 7 and 8 one will see that a chopping and/or crushing component (2, 2') consists of one cutting group (5-6-6A, 5'-6'-6A') and one known cutting element (7-8, 7'-8'), which are part of the device in accordance with the invention and the disk bar (1) respectively.

The cutting group (5-6-6A, 5'-6'-6A') comprises a support (5, 5') which is, in the example given here, a disk with a shape similar to that of the cutting disk (7, 7'), to which are connected some blades (6-6A, 6'-6A') spaced in a regular manner along the edge of the support (5, 5').

In the central part, the support (5, 5') is attached to the cutting disk (7, 7') of the respective cutting element (7-8, 7'-8') by the means of four screws (19, 19') and washers (20, 20').

In their installed position and seen from above, the blades (6-6A, 6'-6A') of one support (5, 5') sweep a circular area of diameter (d, d') smaller than the circular area of diameter (D, D') swept by the cutting blades (8, 8') of the corresponding cutting disk (7, 7'). In this manner the plants are first cut by the cutting blades (8, 8') and are then attacked by the blades (6-6A, 6'-6A '). Thus, in the first stroke one cuts the plants to be chopped and/or crushed relatively close to the ground with the cutting blades (8, 8') and, in a second pass, one chops and/or crushed the plants that have been cut with the blades (6-6A, 6'-6A').

Additionally, the circular area of diameter (d) swept by the blades (6-6A) of the support (5) overlaps, as seen from above, by a distance (10) the circular area of diameter (d') which is swept by the blades (6'-6A') of the adjacent support (5') and by a distance (11) the circular area of diameter (D') which is swept by the cutting blades (8') of the adjacent cutting disk (7').

One will also note that the circular area of diameter (δ) swept by the support (5) overlaps, as seen from above, by a distance (12) the circular area of diameter (D') swept by the cutting blades (8') of the adjacent cutting disk (7'). This distance (12) is, in the example given here, at least approximately equal to one-half the length of the cutting blades (8'). Additionally one will note that the circular area of diameter (d) swept by the blades (6-6A) overlaps, as seen from above, by a distance (13), the circular area of diameter (Δ') swept by the adjacent cutting disk (7'). This distance (13) is at least approximately equal to one-half the length of the blades (6-6A).

Finally, one will note that the support (5, 5') is installed in a particular way on the corresponding cutting disk (7, 7'): its blades (6-6A, 6'-6A') are offset at an angle with respect to the cutting blades (8, 8'). The blades (6-6A) of one support (5) are, additionally, equally offset at an angle with respect to the blades (6'-6A') of the adjacent support (5'). In the case when the support (5, 5'), respectively the corresponding cutting disk (7, 7'), will include each two attachment points (diametrically opposite) for the blades (6-6A, 6'-6A'), respectively the cutting blades (8, 8'), the support (5, 5') is secured to the top of the corresponding cutting disk (7, 7') in such a manner that a straight line, (14, 14') passing through the two connection points of the blades (6-6A, 6'-6A') (represented by the bolts (9, 9') forms an angle which is approximately a right angle with the straight line (15, 15') passing through the two connection points of the cutting blades (8, 8') (shown by the bolts (16, 16'). Additionally, the straight line (14) passing through the two connection points of the blades (6-6A) of the support (5) is offset at an angle with respect to the straight line (14') passing through the two connection points of the blades (6'-6A') of the adjacent support (5'). In the position represented here, this offsetting is 90°. One will note in all cases that this offsetting varies during rotation. In fact, when one installs the supports (5, 5') of the device in accordance with the invention on a disk bar (1), such as has been described heretofore, each support (5, 5') is approximately perpendicular to the corresponding cutting disk (7, 7') and, consequently, the angular offsetting between two adjacent supports (5, 5') is also approximately identical to the angular offsetting between the two corresponding cutting disks (7, 7').

Figure 7:
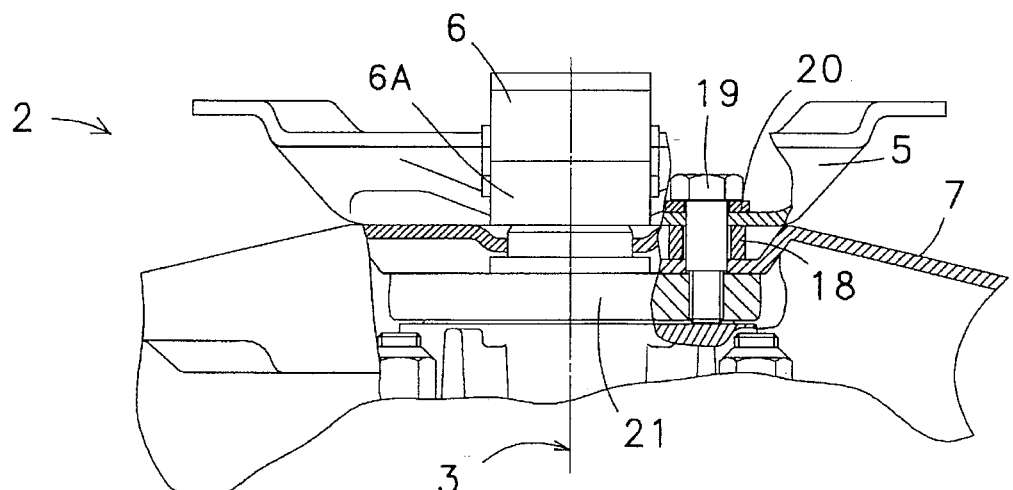
FIG. 7 is a blown up partial view of FIG. 5, showing more specifically the connection of the support of one cutting group of the device to the corresponding cutting disk of the disk bar.
Figure 8:
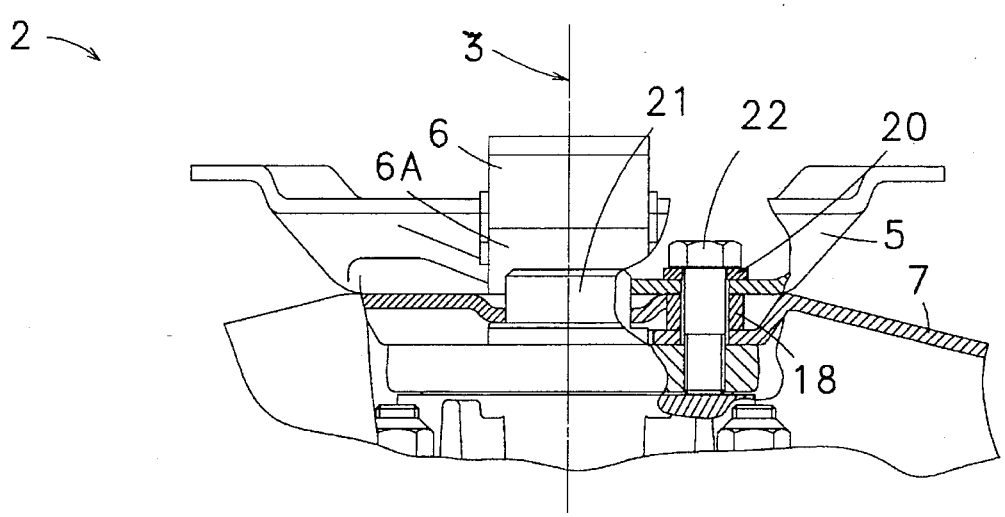
FIG. 8 is a blown up view (similar to that of FIG. 7) of a second method of implementation of the connection of one cutting group support of the device to the corresponding cutting disk of one disk bar.

FIGS. 7 and 8 show more particularly two examples of installation and centering of a support (5) on cutting disk (7). The mount (5) rests with its lower section on one side on the upper section of the cutting disk (7) and, on the other hand, on four cross-pieces (18) which are installed between the said support (5) and the said cutting disk (7). The support (5) and the cutting disk (7) are held together by the intermediary of four screws (19, 22) which are screwed into the drive (21) of the cutting disk (7). For this reason each screw (19, 22) goes through the support (5), a cross-piece (18) and the cutting disk (7) which is centered on the drive (21 ).

FIG. 7 shows more particularly the centering of the support (5) by the intermediary of screws (19) which also function as centering pins. Indeed, each screw (19) is centered in the cutting disk (7) which itself is centered on the drive (21), while the support (5) is centered on the screws (19).

FIG. 8 shows more particularly centering of the support (5) by the intermediary of the drive (21). Indeed, in this solution the support (5) is directly centered on the drive (21), just as the cutting disk (7) is. The screws (22) can be, in this case, simple assembly screws which hold the support (5) on the cutting disks (7). Such a design offers increased strength.

FIG. 6 shows in more detail an example of the connection of two blades (6-6A) on a support (5). The blades (6-6A) are installed in a shelf on the support (5) through the intermediary of a hinge joint (23). The latter includes a bolt (9) which goes right through the support (5), as well as a cross-piece (24) which extends between the two flanges of the shelf and which is immobilized in that position by the bolt (9). The cross-piece (24) extends through holes provided in the blades (6-6A) and its length is somewhat greater than the length of the two blades (6-6A), so that after tightening of the bolt (9), the blades (6-6A) can turn about the axis (25) within the limits permitted by the shelf of support (5). The blades (6-6A) can then retract in case they bump against an obstacle such as a stone.

This design of the hinge (23) also allows one to ensure maximum safety. Indeed, the wearing part of the hinge (23) consists of the cross-piece (24). In case of damage, or breakage of the cross-piece (24) the blades (6-6A) will always remain connected to the support (5) through the intermediary of the bolt (9), whereas if the wearing part consisted directly of the bolt (9), the blades (6-6A) could be projected in case the bolt (9) break, which would constitute a considerable danger for persons located in the vicinity of the machine.

FIG. 6 shows additionally some blades (6-6A) which are bent and placed against one another, so as to form a "Y." Each blade (6-6A) has a cutting edge on both sides. In all cases it is obvious that blades of different shape and different number can be used instead of the ones represented in FIG. 6.

Whereas in FIGS. 6 to 8 we have described a component (2) for chopping and/or crushing (2), one will easily understand that the description applies equally to a tool for chopping and/or crushing.

The device in accordance with the invention also includes a hood (31) which is intended to extend above the chopping and/or crushing components (2, 2'). This hood is shown in FIGS. 1 and 5 and includes a deflecting plate (28) and a holder (26) through the intermediary of which it is fastened to the frame (27) of the machine.

The deflecting plate (28) is connected to the holder (26) by means of adjustable components (29, 29A), allowing one to vary the vertical distance (33) between the deflecting plate (28) and the chopping and/or crushing components (2, 2').

The adjustable components (29, 29A) consist respectively of sleeves (30, 30A) of the holder (26) and shafts (32, 32A) solid with the deflecting plate (28). Each shaft (32, 32A) is to be threaded into its corresponding sleeve (30, 30A) and includes a large number of holes which can be brought out to face a hole provided in the sleeve (30, 30A). A pin (39, 39A) threaded in the hole of the sleeve (30, 30A) and in a hole of the shaft (32, 32A) will maintain the selected distance (33).

Because of this characteristic, it is possible to adjust the distance (33) to the conditions which are encountered (nature and/or density of the product to chop and/or crush. Practical tests have shown that for an average density the distance (33) can advantageously be approximately equal to 70 mm.

The deflecting plate (28) of the hood (31) includes a first area (34) which is approximately horizontal and flat, located above the chopping and/or crushing components (2, 2') and on the front edge (35) of which a second area (36) is connected with extends forward and upward. On the rear edge (37) of the first area (34), a third area (38) is attached which extends downward.

The forward edge (35) of the first area (34) is located somewhat forward of the axis of rotation (3, 3') of the chopping and/or crushing components (2, 2'). The forward edge (17) of the second area (36) extends approximately above the front part of the circular area of diameter (D, D') which is swept by the cutting blades (8, 8') of the cutting disks (7, 7'). With respect to the rear edge (37) of the first area (34), the latter is located approximately above the rear section of the circular area of diameter (D, D') which is swept by the cutting blades (8, 8').

The third area (38) is connected to the rear edge (37) of the first area (34) by a pivot connection (41) which allows one to vary the angle ($\Omega$) which is made by the third area (38) with the first area (34). Adjustment of the angle ($\Omega$) is achieved by the intermediary of an adjustable shaft (42) which has a large number of holes (43). This adjustable shaft (42) is connected to the third area (38) at (44) and to the first area (34) at (45). Adjustment of the angle ($\Omega$) is achieved by connecting the adjustable shaft (42) at (45) through the intermediary of the hole (43) of sufficient size, which has the effect of causing the third area (38) to pivot on the pivot joint (41) which is in the selected angular position.

The third area (38) can also be adjusted with respect to height by the intermediary of adjustable shafts (47) which each have a large number of holes (46) and solid with the third area (38). The adjustment of the height of the third area (38) with respect to the crushing components (2, 2') is achieved by displacement of the adjustable shaft (47) with respect to the pivot joint (41) by the intermediary of the holes (46).

By means of this arrangement it is therefore possible to adjust, on the one hand, the distances (48, 49) of the lower edge (40) of the third area (38) with respect to the cutting blades (8, 8') of the cutting disks (7, 7') and, in addition, the angle ($\Omega$) of the third area (38) with respect to the first area (34). This adjustment allows one to adapt to the different conditions which are encountered. It also allows one to vary the discharge opening for the chopped and/or crushed plants and, by doing so, to slow down at will the discharge of plants to be chopped and/or crushed in order to determine their degree of chopping and/or crushing.

Indeed, when one increases the distances (48 and/or 49) and/or the angle ($\Omega$), one increases the discharge opening of the chopped and/or crushed plants; the latter will then be subjected for less time to the action of the chopping and/or crushing components (2, 2'). Inversely, when one reduces the distances (48 and/or 49) and/or the angle ($\Omega$), one will cause the plants to remain for a longer time in the operating zone of the chopping and/or crushing components (2, 2'), which will increase the degree of chopping and/or grinding of the plants. In practice, satisfactory chopping and/or crushing have been obtained with a distance (49) which is approximately equal to 55 mm, a distance (48) which is approximately equal to 65 mm and an angle ($\Omega$) which is approximately equal to 110°.

Figure 9:
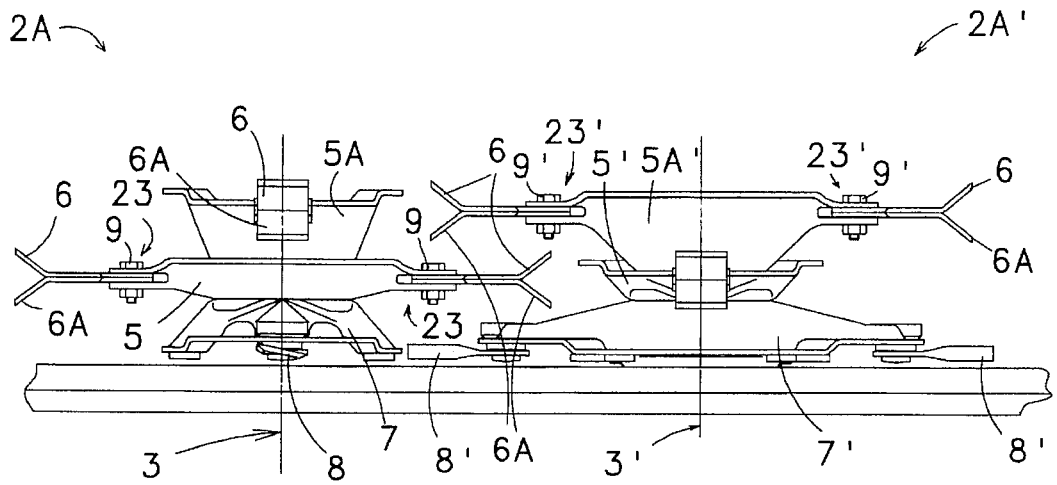
FIG. 9 is a front view of a second form of implementation of the device installed on a disk bar, without the hood.
Figure 10:
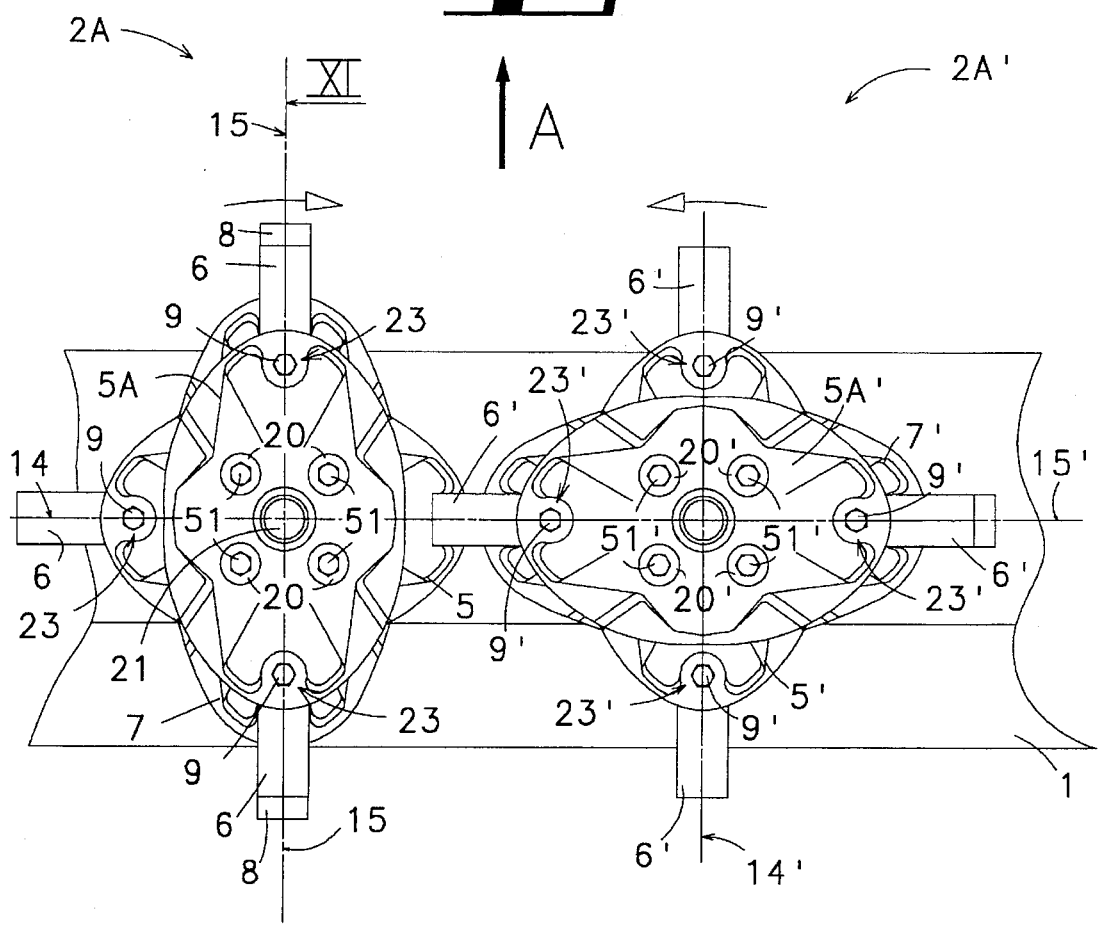
FIG. 10 is a view from above of the mechanism shown in FIG. 9.

The device as represented in FIGS. 9, 10, and 11 is, in principle, entirely similar to that which has been described previously, except with respect to the design of the chopping and/or crushing components and the hood which overhangs the latter.

In this example of implementation, each chopping and/or crushing component (2A, 2A') includes a support (5A, 5A') which is provided with blades (6-6A, 6'-6A') additionally installed on a first support (5, 5') with an angle offsetting with respect to the latter (in the examples shown this angular offsetting is about 90°). The support (5A, 5A') are identical to the support (5, 5').

FIG. 11 shows that the support (5A) rests with its lower part on the four cross-pieces (50) which are installed between the support (5A) and the corresponding support (5). The support (5A), the support (5) and the cutting disks (7) are held together by four screws (51) which are screwed into the drive mechanism (21). For this reason each screw (51) passes through the support (5A), a cross-piece (50), the support (5), a cross piece (18) and the cutting disk (7) which is centered on the drive mechanism (21). The screws (51) are also used as centering pins just as the screws (19) which were described previously.

One will note that the installation of a support (5A') on the support (5') and the corresponding cutting disks (7') will operate in the same way.

The hood (31A) which overhangs the chopping and/or crushing components (2A, 2A') includes a deflecting plate (28A) and a support (26A) through the intermediary of which it is fastened to the frame (27) of the machine.

The deflecting plate (28A) also includes a first area (34A), approximately horizontal and flat, extending a distance (33) above the chopping and/or crushing components (2A, 2A'). At the forward edge (35) of this first area (34A), a second area (36) is attached which is identical to the second area (36) described previously. On the rear edge (37A) of the first area (34A) is attached a third area (38A) which extends downward and is inclined to the rear at an angle ($\Omega$). The lower edge (40) of this third area (38A) extends a certain distance (48) above the sectional plane of the cutting blades (8, 8') and at a certain distance (49) to the rear of the circular area of diameter (D, D') described by the cutting blades (8, 8').

The disk bar (1) which is thus combined with the device in accordance with the invention operates in the following manner.

During work the machine is operated in a field covered with plants to be chopped and/or ground. The plants are first simply cut near the ground by the cutting blades (8, 8') of the cutting disks (7, 7'). For this purpose the second area (36) of the hood (31, 31A) bends the plants slightly so that the cutting blades (8, 8') can correctly cut off the latter and so that the cut plants will correctly and easily enter beneath the lid (31, 31A). The latter has the function of holding briefly the plants so that the latter are correctly subjected to the action of the blades (6-6A, 6'-6A'). Indeed, the first area (28, 28A) leaves the plants on the blades (6-6A, 6'-6A') and the third area (38, 38A) briefly slows down the discharge of the plants through the rear discharge opening.

The device shown in FIGS. 12 and 13 is, in principle, completely similar to that described according to the first method of implementation, except that it also includes holding elements (52) and a means (56) of lifting the disc bar (1).

Indeed, in this example of implementation, holding elements (52) are secured between the front edge (35) of the first area (34) and the rotational axes (3, 3'). Each holding dement (52) extends from its point of attachment to the first area (34) toward the rear—considering the direction of forward movement (A)—and downward in the direction of the chopping and/or grinding components (2, 2'). As seen in the forward direction (A) during the work cycle, each holding element (52) extends additionally halfway between the axes of rotation (3, 3') of the two corresponding chopping and/or crushing components (2, 2').

In the example of implementation shown here, each holding dement (52) comprises of a flat parallel-piped section whose lower side (53) is at least approximately parallel to the first area (34). In practice, satisfactory chopping and/or crushing have been able to be obtained with a distance (54) between the front point of the lower side (53) of each holding element (52) and the axes of rotation (3, 3') of the corresponding chopping and/or crushing components (2, 2'), at least approximately equal to 100 mm and when the lower side (53) of the holding element (52) is near the volume swept by the blades (6-6A, 6'-6A') of the corresponding chopping and/or crushing components (2, 2').

Lifting means (56) are also provided which are, in the example of implementation shown here, shoes (57) which are attached beneath the disk bar (1) and spaced at least approximately evenly under the latter device. Each shoe (57) includes an area (58) at least approximately flat which is intended to glide along the ground during work.

During work the machine rests on the ground by means of the shoes (57) and is operated in a field covered with plants to be chopped and/or crushed. The plants are first simply cut off near the ground by the cutting blade (7, 7'). For this purpose the second area (36) of the hood (31) slightly bends the plants so that the cutting blades (8, 8') can properly cut the latter off and so that the cut plants will correctly and easily enter beneath the hood (31 ). The latter has the function of briefly keeping in connection with the holding elements (52) of the plants so that the latter will be properly subjected to the action of the blades (6-6A, 6'-6A').

Indeed, the first area (28) leaves the plants on the blades (6-6A, 6'-6A') and the third area (38) briefly retards the discharge of the plants through the rear discharge opening.

By using this machine one not only obtains a perfect cut of the plants, but also good chopping and/or crushing of the latter.

It is important to note that the device in accordance with the invention allows one to transform a disk mower into a chopper-mower and/or a crusher-mower, but also that this device can at any time be dismantled so that the user can again use the machine as a simple mower.

Finally, different modifications are possible, especially with respect to the make-up of the different elements or by substitution of equivalent techniques, without however leaving the scope of patent protection as defined in the claims.

It is particularly quite conceivable to power the various chopping and/or crushing components (2, 2', 2A, 2A') in different directions of rotation than those indicated in the figures.

It is also perfectly possible that the position of the different supports (5, 5', 5A, 5A') between them or with respect to the cutting disks (7, 7'), as well as the dimensions of the said supports (5, 5', 5A, 5A') with respect to those of the cutting disks (7, 7') can be different than those shown here.

It is also possible that the supports (5, 5', 5A, 5A') can have a shape different than that shown here.

Moreover, it is perfectly possible to combine with one another the different elements of the three examples of implementation described here.

It is also possible that one can provide a device located at the level of the shoes (57) which allows one to control the cutting height of the plants.

It is also conceivable that the lifting means (56) comprise of a roller extending at least approximately perpendicular to the direction of movement (A) behind the disk bar (1).

The device in accordance with the invention allows one to transform the known disk mower, placed at the rear (in harnessed or dragged version) or in front of a powered vehicle, into a mower/chopper and/or mower-crusher.

It is also possible to use this device in combination with a disk bar in machines of the grinder, chopper, spreader, and other types which are traditionally used for management of open spaces such as orchards, sides of roads, and so forth. Obviously, numerous modifications and variations of the present invention are possible in light of the above teachings. It is therefore to be understood that within the scope of the appended claims, the invention may be practiced otherwise than as specifically described herein.

I claim:

1. A device that is to be combined with a disk bar which includes a plurality of cutting elements, each one of the cutting elements turning about a respective upwardly directed axis during work, said plurality of cutting elements being arranged alongside one another along a line which is transverse with respect to a movement direction of the device during work, each cutting element comprising a cutting disk and cutting blades which are connected to said cutting disk, the device including:

- a plurality of cutting groups, each one of said cutting groups including at least one support which is provided with at least one blade and adapted to be attached to the cutting disk of a corresponding cutting element, a cutting group and the corresponding cutting element constituting a chopping and/or crushing component; and
- a hood which is intended to extend above the chopping and/or crushing components, wherein said hood includes a deflecting plate, including a first area which is approximately horizontal and flat, located above the chopping and/or crushing components and has a front edge onto which is attached a second area which extends toward the front and upward, while at a rear edge of said first area a third area is attached which extends downward.

2. A device according to claim 1, wherein in an installed position, the front edge of the first area is located forward of the axes of rotation of the chopping and/or crushing components.

3. A device according to claim 1, further comprising:

at least one holding element which is used to decelerate cut plants and which is, seen at a right angle to the direction of movement during work, secured to the first area between the front edge of the latter and the axes of rotation of the corresponding chopping and/or crushing components, and, as seen following the travel direction during the work, at least approximately in a central section between said axes of rotation of said corresponding chopping and/or crushing components, said holding element further extends from a point of attachment to the first area toward the rear and downward.

4. A device according to claim 3, wherein said holding element comprises a flat piece of iron.

5. A device according to claim 1, wherein in an installed position, a front edge of the second area extends approximately above a front section of a second circular area of a second diameter swept by the cutting blades.

6. A device according to claim 1, wherein in an installed position, the rear edge of the first area is located approximately above a rear section of a second circular area of a second diameter swept by the cutting blades.

7. A device according to claim 1, wherein a vertical distance between the first area and the chopping and/or crushing components is adjustable.

8. A device according to claim 1, wherein an angle which is made by the third area with the first area is adjustable.

9. A device according to claim 1, wherein a vertical distance between a lower edge of the third area and a second circular area swept by the cutting blades of the cutting disks is adjustable.

10. A device according to claim 1, wherein a longitudinal distance along the travel direction in work between a lower edge of the third area and a rear section of a second circular area of a second diameter swept by the cutting blades of the cutting disks is adjustable.

11. A device according to claim 1, wherein a lower edge of the third area is located higher than the cutting blades and, considering the direction of movement during work, behind a rear section of a second circular area of a second diameter swept by said cutting blades.

12. A cutting machine comprising:

(a) a disk bar which includes a plurality of cutting elements each one turning about a respective axis directed upward during work, said plurality of cutting elements being arranged alongside one another along a line which is transverse with respect to a direction of travel of the machine during work, each cutting element comprising a cutting disk and cutting blades attached to said cutting disk; and (b) a device combined with said disk bar and which includes:

i) a plurality of cutting groups, each one including at least one support provided with at least one blade and adapted to be attached to the cutting disk of a corresponding cutting element, a cutting group and the corresponding cutting element constituting chopping and/or crushing component; and ii) a hood adapted to extend above the chopping and/or crushing components, wherein said hood includes a deflecting plate which includes a first area which is approximately horizontal and flat, located above the chopping and/or crushing components and has a front edge onto which is attached a second area which extends toward the front and upward, while at a rear edge of said first area there is attached a third area extending downward.

13. A cutting machine according to claim 12, wherein in an installed position, the front edge of said first area is located forward of the axes of rotation of the chopping and/or crushing components.

14. A cutting machine according to claim 12, further comprising:

at least one holding element which is used to decelerate cut plants, which comprises a flat piece of iron and is, when seen orthogonally to the travel direction during work, secured to the first area between the front edge of the latter and the axes of rotation of the corresponding chopping and/or crushing components, and, when seen along the travel direction during work, at least approximately in a central section of said axes of rotation of said corresponding chopping and/or crushing components, said holding element further extends from an attachment point to the first area toward the rear and down.

15. A cutting machine according to claim 12, wherein in an installed position, a front edge of the second area extends approximately above a front section of a second circular area of a second diameter which is swept by the cutting blades and/or the rear edge of the first area is located approximately above a rear section of said second circular area.

16. A cutting machine according to claim 12, wherein a vertical distance between the first area and the chopping and/or crushing components is adjustable.

17. A cutting machine according to claim 12, wherein an angle which is made by the third area with the first area is adjustable, and/or a vertical distance between a lower edge of the third area and a second circular area swept by the cutting blades of the cutting disks is adjustable.

18. A cutting machine according to claim 12, wherein a longitudinal distance along the travel direction during work between a lower edge of the third area and a rear section of a second circular area of a second diameter swept by the cutting blades of the cutting disks is adjustable.

19. A cutting machine according to claim 12, wherein a lower edge of the third area is located higher than the cutting blades and, considering the travel direction during work, behind a rear section of a second circular area of a second diameter swept by said cutting blades.

* * * * *